(12) United States Patent
Coffing

(10) Patent No.: US 11,611,584 B2
(45) Date of Patent: Mar. 21, 2023

(54) SMART BITS

(71) Applicant: Cloudentity, Inc., Seattle, WA (US)

(72) Inventor: Nathanael Coffing, Seattle, WA (US)

(73) Assignee: Cloudentity, Inc., Seattle, WA (US)

(*) Notice: Subject to any disclaimer, the term of this patent is extended or adjusted under 35 U.S.C. 154(b) by 263 days.

(21) Appl. No.: 16/807,072

(22) Filed: Mar. 2, 2020

(65) Prior Publication Data

US 2020/0389494 A1    Dec. 10, 2020

Related U.S. Application Data

(60) Provisional application No. 62/812,333, filed on Mar. 1, 2019.

(51) Int. Cl.
*H04L 9/00* (2022.01)
*H04L 9/40* (2022.01)

(52) U.S. Cl.
CPC ...... *H04L 63/1491* (2013.01); *H04L 63/0236* (2013.01); *H04L 63/0281* (2013.01); *H04L 63/105* (2013.01); *H04L 63/1425* (2013.01); *H04L 63/20* (2013.01)

(58) Field of Classification Search
CPC .. H04L 63/1491; H04L 63/1425; H04L 63/20
USPC .......................................................... 726/1
See application file for complete search history.

(56) References Cited

U.S. PATENT DOCUMENTS

| | | | |
|---|---|---|---|
| 8,561,127 B1 | 10/2013 | Hebbar et al. | |
| 9,294,442 B1* | 3/2016 | Lian | H04L 63/0263 |
| 9,910,994 B1 | 3/2018 | Sharifi Mehr | |
| 10,097,452 B2 | 10/2018 | Lefebvre et al. | |
| 10,523,443 B1 | 12/2019 | Kleinman | |
| 11,256,799 B2 | 2/2022 | Forehand | |
| 11,341,484 B2 | 5/2022 | Wright et al. | |
| 2007/0280112 A1* | 12/2007 | Zheng | H04L 12/66 370/235 |
| 2016/0044054 A1* | 2/2016 | Stiansen | H04L 63/1416 726/24 |
| 2018/0189528 A1 | 7/2018 | Hanis et al. | |
| 2018/0189529 A1 | 7/2018 | Chen et al. | |
| 2018/0293573 A1 | 10/2018 | Ortiz et al. | |
| 2019/0279204 A1 | 9/2019 | Norton et al. | |
| 2020/0084026 A1 | 3/2020 | Reading et al. | |
| 2020/0252376 A1* | 8/2020 | Feng | H04L 63/0263 |

(Continued)

*Primary Examiner* — Christopher J Brown
(74) *Attorney, Agent, or Firm* — Perkins Coie LLP

(57) ABSTRACT

Systems and methods for intelligent data routing based on data type are provided. A proxy installed on a client device receives a data stream and scans the data stream for classification parameters associated with sensitive data. A data stream may be broken down, for example, to data packets, classified using known libraries containing characteristics of a classification, and routed based on applicable policies governing each classification. The routed data packets are constantly monitored and may be re-routed to a network designed to handle highly sensitive data, a network designed to handle data with high security risk, or to another applicable service infrastructure as needed, before reaching the intended recipient. The classification libraries may be updated based on the monitored data and change in classification of the data packet.

20 Claims, 3 Drawing Sheets

(56) References Cited

U.S. PATENT DOCUMENTS

2020/0389435 A1 12/2020 Coffing
2020/0389494 A1 12/2020 Coffing

* cited by examiner

SMART BITS

CROSS-REFERENCE TO RELATED APPLICATIONS

The present patent application claims the priority benefit of U.S. Provisional Patent Application No. 62/812,333 filed on Mar. 1, 2019 and entitled "Smart Bits" the disclosure of which is incorporated herein by reference in its entirety.

BACKGROUND OF THE INVENTION

1. Field of the Invention

The present invention generally relates to data routing. More specifically, the present invention relates to intelligent routing of data based on data type.

2. Description of the Related Art

Presently available computing networks do not distinguish between different data types that are being transmitted among various applications and client devices in data communication networks. A data packet that is sent using such communication networks may be passed along by such devices, which has little or no visibility in the type of data being transmitted.

Classified or sensitive data are required to comply with security, inspection, and privacy regulations. Depending on the data types, the data are subjected to different regulations. For example, Personally Identifiable Information (PII) data governed by California Consumer Privacy Act (CCPA) are required to flow through API gateway or a client that is able to obtain consent from the owner of the data to use the data. On the other hand, Payment Card Industry data (PCI) are required to travel through Intrusion Detection and Prevention Systems (IPS), which monitor traffic in the cardholder data environment and issue timely alerts to suspected compromises.

Currently, a data packet containing multiple types of data may flow through a centralized system that does not distinguish different types of data in the data packet. The data streams in their entirety may be required to be transmitted through multiple security and inspection pathways that different data packets may be subjected to, depending on the number of different data types in the packets. This increases traffic through each security and inspection infrastructure components, which in turn increases latency and the cost of operating a security infrastructure.

There is, therefore, a need in the art for systems and methods of intelligent routing of data packets based on data type.

SUMMARY OF THE CLAIMED INVENTION

Embodiments of the present invention provide for dynamic routing of data based on data type. A proxy installed on a client device receives a data stream and scans the data stream for classification parameters associated with sensitive data. A data stream may be broken down, for example, to data packets, classified using known libraries containing characteristics of a classification, and routed based on applicable policies governing each classification. The routed data packets are constantly monitored and may be re-routed to a network designed to handle highly sensitive data, a network designed to handle data with high security risk, or to another applicable service infrastructure as needed, before reaching the intended recipient. The classification libraries may be updated based on the monitored data and change in classification of the data packet.

Various embodiments may include methods for dynamic routing of data. Such methods may include installing a proxy on a client device in a communication network, monitoring data packets received at the client device via proxy, scanning each received data packet for classification parameters associated with sensitive data, classifying the received data packets as sensitive based on the scan, and routing the classified data packet in accordance with one or more services applicable to the sensitive data classification.

Further embodiments may include systems for intelligent routing of data. Such system may include a client device capable of communicating over a communication network, a proxy installed on the client device, service infrastructures process the data packets according to applicable policies of the sensitive data, a honeypot device or network capable of handling highly sensitive or nefarious data, and libraries containing characteristics of sensitive data to aid in data classification. Systems may further include a memory and a processor that executes instructions stored in memory to install a proxy on a client device, monitor data packets received at the client device, classify the data packet, and route the classified data packet to one or more services applicable to sensitive data classification.

Yet further embodiments may include non-transitory computer-readable storage media having embodied thereon programs that are executable to perform the methods described herein.

DETAILED DESCRIPTION

Figure 1:
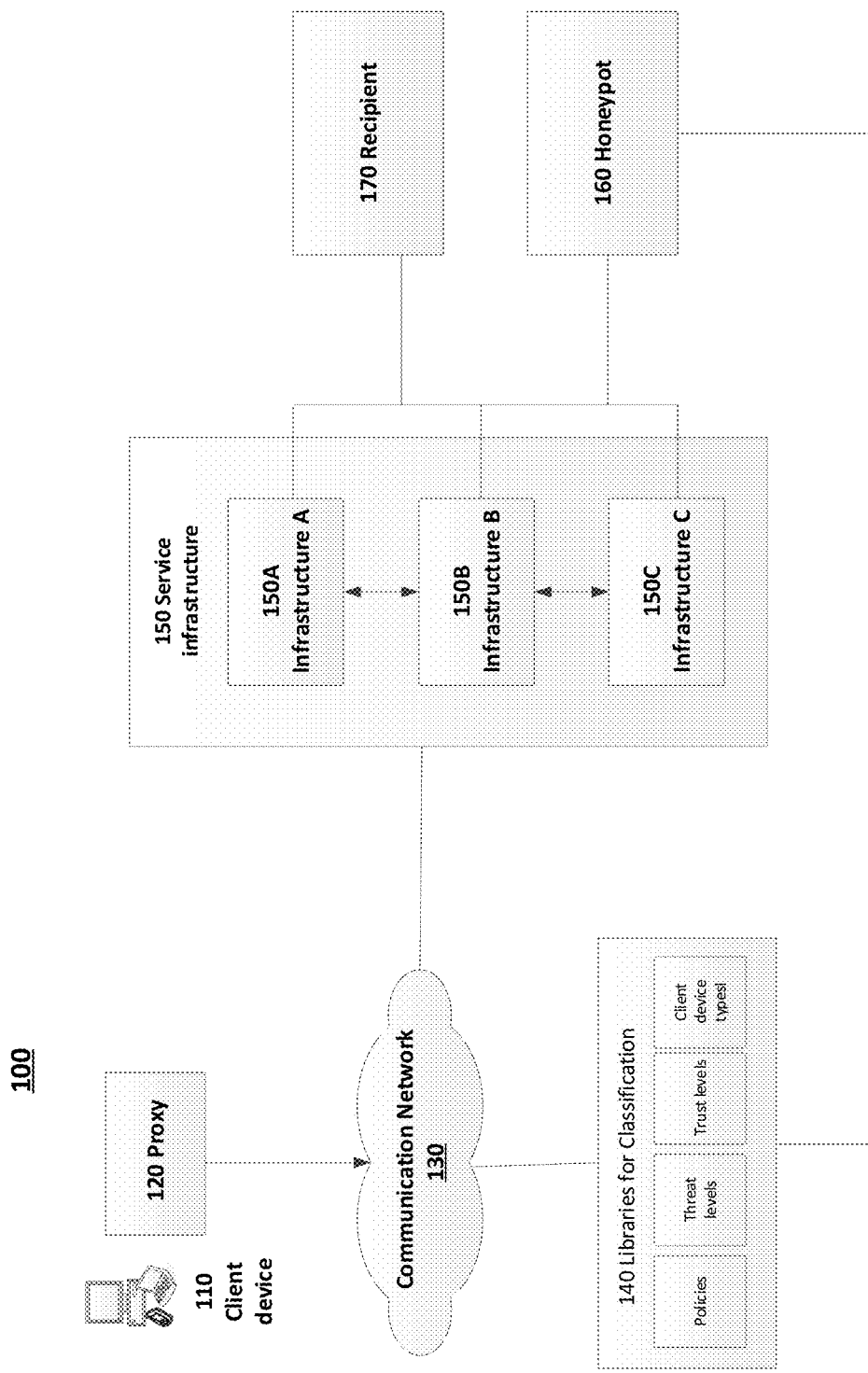
FIG. 1 illustrates a simplified network environment in which a system for routing may be implemented.

Embodiments of the present invention provide for dynamic routing of data based on data type through various communication systems known in the art, including mesh networks, 5G networks, etc. Such routing (and re-routing) may be based on a variety of factors and classifications, which may be based data type, threat level, application trust level (of the application to which the data is routed), and other aspects of the data being transmitted, as well as the client devices involved with the transmission. As data packets are transmitted between client devices, therefore, such data packets may be evaluated in real-time so as to evaluate the determinative factors for classification purposes, and based on the classification, identify whether to allow the current route to proceed or to re-route the data in accordance with applicable policies. For example, a data stream may contain a data packet containing PII and another data packet containing Protected Health Information (PHI). Each packet of data is transmitted to different security or inspection infrastructure based on the identified classification instead of the data packet being transmitted to a centralized security interface. This distributed routing reduces traffic through each of the security and inspection infrastructure components, reduce latency, and reduce the cost of operation of a data organization that provides a customer engagement service using the data from customers.

In exemplary embodiments of the present invention, a proxy (or agent) may be installed on or otherwise associated with each client device. Such proxy may be tasked with evaluating data streaming through the same. As such, the proxy may scan the data upon receipt at the associated client device in real-time and evaluate in accordance with any policies applicable to the associated client device prior to releasing to a next client device in a current route. Such data may be evaluated and classified in real-time by the proxy/agent. Such real-time visibility into the transmitted data further allows for re-routing, authentication, and other security measures to be taken based on evaluation and classification.

The data may be evaluated for defined factors to determine compliance with security policies. Certain financial data may include or exhibit parameters that may be used to classify packets as potentially including sensitive financial data; likewise, health-related data may include or exhibit certain characteristics that may be used to classify packets that contain the same.

Existing libraries regarding different types of data (e.g., different categories and levels of sensitive data) may be used in classification of data. In addition, new libraries may be developed, or existing libraries may be continually updated in view of new information regarding sensitive data types and characteristics thereof, as well as libraries pertaining to different types of policies, threat levels, applications and respective trust levels, and client device types.

Based on such classification (e.g., as health-related data), certain policies may be identified as being applicable. For example, Personally Identifiable Information (PII) data governed by California Consumer Privacy Act (CCPA) are required to flow through API gateway or a client that is able to obtain consent from the owner of the data regarding use of the data. On the other hand, Payment Card Industry data (PCI) are required to travel through Intrusion Detection and Prevention Systems (IPS), which monitor traffic in the cardholder data environment and issue timely alerts to suspected compromises.

The classified data may then be routed (or re-routed) to services for additional authentication or other security protocols (e.g., deemed necessary or advisable in order to protect such data) in accordance with the applicable policies. The data packets are constantly scanned for the classification to match against different types of classification and to update the current classification. The data packets are transmitted into the appropriate security streams, which are routed to different security controls applicable to protect each packet at the juncture.

Such dynamic routing (and re-routing) may utilize software-defined networking to implement its policies. When data is classified as highly sensitive, for example, such data may be re-routed in real-time to specified services for application of additional classification, authentication, protection, risk mitigation, and other protocols.

Alternatively, the data may be re-routed to designated honeypot devices or networks rather than continue on its original route. Honeypot devices and networks may exist in parallel with and may be configured to appear like the intended recipient computing devices and networks. Such honeypot devices and networks may be specifically designated, however, to handle data classified as representing a certain level of security risks (e.g., high risk). Such honeypot devices and networks may engage with the sensitive or high-risk data, but lack the real or valid data maintained by the intended recipients. In addition, honeypot devices and networks may be isolated from the intended devices and networks. As such, the sensitive or high-risk data may be monitored during engagement with the honeypot device or network for security purposes, as well as research purposes. Such monitoring may further inform a feedback loop to improve and update current classification, routing, and security processes.

If the data packet that was re-routed to a honeypot device is determined to lack security risks, the system may validate the client that has transmitted the data packet and process traffic from the client normally. Thus, according to the threat level reclassification, the system may dynamically reconfigure the traffic based on the content of the data stream.

FIG. 1 illustrates an exemplary network environment 100 in which a system for data routing may be implemented. As illustrated, the network environment 100 may include a client device 110, a proxy 120, a communication network 130, a pluralities of libraries 140, a plurality of infrastructures 150A, 150B, and 150C, honeypot 160, and a recipient device 170.

The client device 110 may be any number of different electronic devices, such as general purpose computers, mobile phones, smartphones, smartwatches, wearable devices, personal digital assistants (PDAs), portable computing devices (e.g., laptop, netbook, tablets), desktop computing devices, handheld computing device, smart sensors, smart appliances, IoT devices, devices networked to controllers for smart control, servers and server systems (including cloud-based servers and server systems), or any other type of computing device capable of communicating over communication network 130. Such device 110 may also be configured to access data from other storage media, such as local caches, memory cards, or disk drives as may be appropriate in the case of downloaded services. Client device 110 may include standard hardware computing components such as network and media interfaces, non-transitory computer-readable storage (memory), and processors for executing instructions that may be stored in memory.

For simplicity, only one client device 110 is illustrated; however, the recipient 170 may receive routed data from a plurality of client devices 110. Proxy 120 may be any intelligent HTTP proxy that provides dynamic service discovery, load balancing, circuit breakers, traffic routing, metrics and more. In this embodiment, the proxy 120 is installed on or otherwise associated with each client devices and scans the data upon receipt at the associated client device 110 in real-time and evaluate in accordance with any policies applicable to the associated client device 110 prior to releasing to a next client device in a current route.

Proxy 120 may use libraries 140 stored in the communication network 130 for classifying different types of data. In addition, new libraries 140 may be developed, or existing libraries may be continually updated in view of new information regarding sensitive data types and characteristics thereof, as well as libraries pertaining to different types of policies, threat levels, applications and respective trust levels, and client device types.

Communication network 130 may include a local, proprietary network (e.g., an intranet) and/or may be a part of a larger wide-area network. The communications network 130 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider.

Examples of network service providers are the public switched telephone network, cellular or mobile service providers, a cable service provider, a provider of digital subscriber line (DSL) services, or a satellite service provider. Communications network 130 allows for communication between the various components of network environment 100.

The communication network 130 transmits scanned data packets from the proxy 120 to a plurality of infrastructures 150A, 150B, and 150C that provide different services for authentication or security protocols in accordance with the applicable policies. For example, an API gateway may serve as an infrastructure for PII data. Another infrastructure may be IPS for PCI data. Web Application Firewall (WAF) is another example of an infrastructure for PCI and PII data. For simplicity, only three infrastructures are illustrated as in FIG. 1. In an embodiment, a packet of data of the data stream that was identified as PII may flow into API gateway infrastructure, whereas another packet of data of the same data stream identified as PCI may flow through IPS infrastructure. The data packet may be rerouted from one infrastructure to another, until the data packet reaches the recipient 170, or a honeypot 160. A honeypot 160 is designated to monitor and handle data classified as representing a certain level of security risk. The monitored data from the honeypot is used to further update the libraries 140 to improve current classification.

Figure 2:
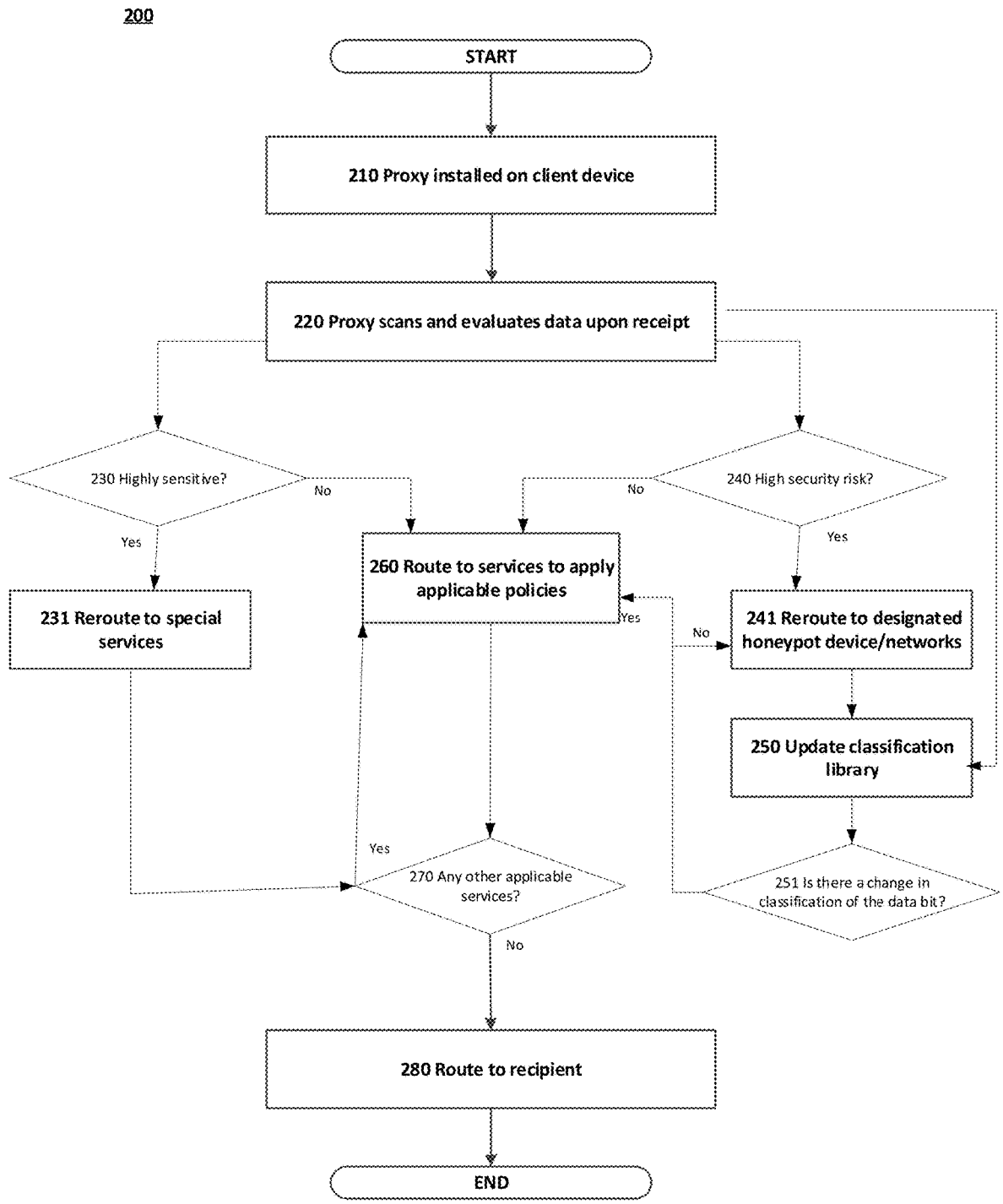
FIG. 2 is a flowchart illustrating an exemplary method for intelligent data routing.

FIG. 2 illustrates a flowchart illustrating an exemplary method for data routing. At step 210, the proxy (or agent) 120 is installed on the client device 110. At step 220, the proxy 120 scans the data stream upon receipt to evaluate the data for any policies applicable to the associated client device 110. The data may be scanned for defined factors to identify the policies that are applicable to each data packets of the data stream. Certain financial data may include or exhibit parameters that may be used to classify packets as potentially including sensitive financial data; likewise, health-related data may include or exhibit certain characteristics that may be used to classify packets that contain the same. Existing libraries that contain categories and levels of sensitive data may be used in classification.

At step 230, the data stream is scanned to identify if the data packets contain highly sensitive data. Such data packet is rerouted in real-time to specified services for application of additional classification, authentication, protection, risk mitigation, and other protocols at step 231. If the data packet is not highly sensitive, the data packet may continue the current route to service infrastructures to be applied applicable policies at step 260.

At step 240, the data stream is scanned to identify if the data packets contain high security risk. Such data packet is rerouted to designated honeypot devices or networks at step 241. If the data packet does not contain high security risk, the data packet may continue the current route to service infrastructures to be applied applicable policies at step 260. The sensitive or high risk data may be monitored during engagement with honeypot device or network to update the current classification in the classification library at step 250. At step 251, if the data packet that was re-routed to a honeypot device is determined to lack security risks, the data packet may be allowed to proceed in the normal route to the applicable service infrastructure. If there is no change in the classification of the data packet, the data packet will remain in the honeypot device or networks.

At step 260, the scanned and evaluated data packets are routed to different infrastructures that serve different protocols in accordance with the applicable policies. For example, a data packet of the data stream that was identified as PII may flow into API gateway infrastructure, whereas another data packet of the same data stream identified as PCI may flow through IPS infrastructure. At step 250, the data packets are routed to another service 150A, 150B, or 150C, to the intended recipient 170, or rerouted to a honeypot 160.

At step 270, the system determines whether any other service infrastructure may be applicable to the data packet. If there are other service infrastructure that may be applicable to the data packet, the data packet is routed to additional services to apply applicable policies. If there are no more service infrastructure that is applicable, the data packet is routed to the recipient at step 280.

Figure 3:
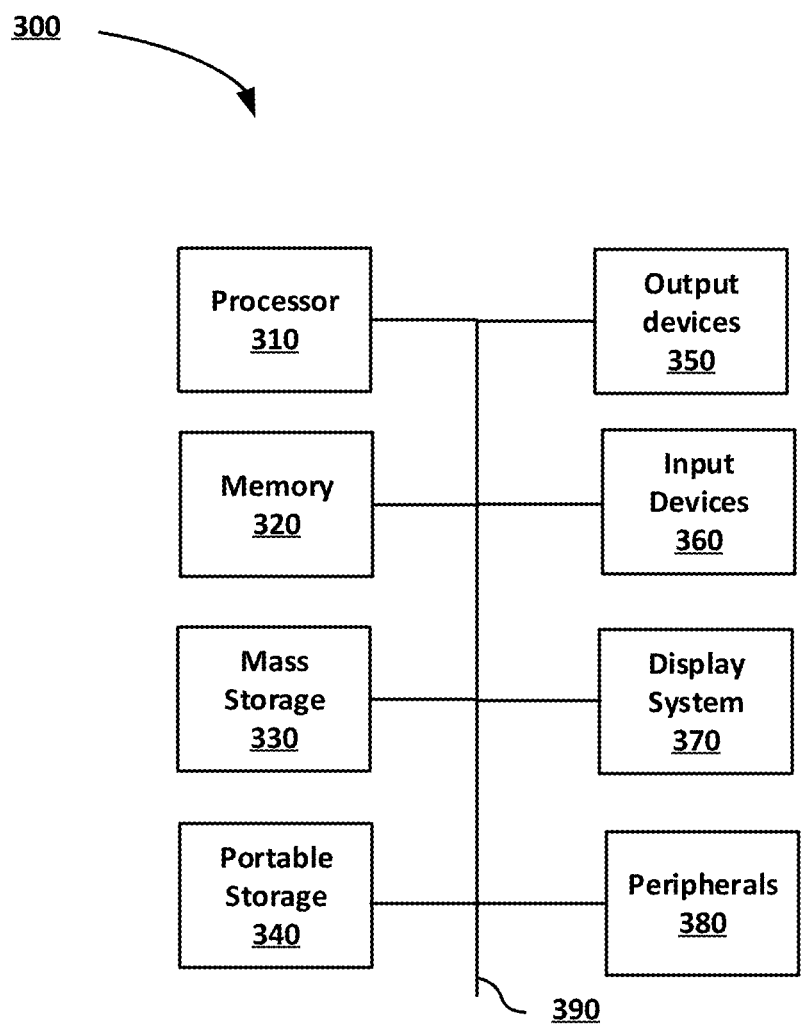
FIG. 3 illustrates an exemplary computing system that may be used in implement an embodiment of the present invention.

FIG. 3 illustrates an exemplary computing system 300 that may be used to implement an embodiment of the present invention. System 300 of FIG. 3 may be implemented in the contexts of the client device 110. The computing system 300 of FIG. 3 includes one or more processors 310 and memory 320. Main memory 320 stores, in part, instructions and data for execution by processor 310. Main memory 320 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus 390, and the mass storage device 330, peripheral device(s) 380, portable storage device 340, and display system 370 may be connected via one or more input/output (I/O) buses 390.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk (CD) or digital video disc (DVD), to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The components contained in the computing systems performing the methods and functions disclosed herein are those typically found in computer systems that may be suitable for use with embodiments of the present invention and are intended to represent a broad category of such computer components that are well known in the art. Such computing components may include any variety of computing components known in the art, including memory, processors, and network communication interfaces. Further, the present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for intelligent routing of data, the method comprising:
installing a proxy on a client device in a communication network;
monitoring data packets received at the client device via the proxy, wherein monitoring the received data comprises scanning each received data packet for one or more classification parameters associated with sensitive data;
classifying a first data packet and a second data packet as sensitive based on the scan detecting the parameters associated with sensitive data;
determining that the first data packet comprises payment card industry data, the second data packet comprises personally identifiable information data, and the payment card industry data is different from the personally identifiable information data,
wherein the personally identifiable information data is required to flow through an application programming interface (API) gateway; and
routing the first and the second data packets in accordance with one or more policies applicable to the sensitive data classification,
wherein the routing comprises:
transmitting the first data packet to an intrusion detection and prevention system that generates alerts in response to traffic in a cardholder data environment being compromised; and
transmitting the second data packet to a web application firewall (WAF).

2. The method of claim 1, wherein classifying the first and the second data packets as sensitive includes separating the first and the second data packets from one or more other data packets in a data stream, wherein at least one of the other data packets in the data stream has a different classification.

3. The method of claim 2, further comprising routing the at least one of the other data packets in the data stream in accordance with different policies applicable to the different classification.

4. The method of claim 1, wherein routing the first and the second data packets includes routing the first and the second data packets to a honeypot.

5. The method of claim 4, further comprising identifying via the honeypot that the first and the second data packets do not meet a defined level of security risk, and further routing the first and the second data packets based on the identification that the first and the second data packets do not meet the defined level of security risk.

6. The method of claim 4, further comprising identifying via the honeypot that the first and the second data packets meet a defined level of security risk, and continuing to isolate the first and the second data packets via the honeypot based on the identification that the first and the second data packets meet the defined level of security risk.

7. The method of claim 1, wherein classifying the first and the second data packets is based on one or more libraries that store a plurality of parameters associated with the sensitive data.

8. The method of claim 1, wherein the first and the second data packets are routed from one service infrastructure governed by at least one of the policies to another service infrastructure governed by another one of the policies until the policies applicable to the sensitive classification are satisfied.

9. A system for intelligent routing of data, the system comprising:
a proxy installed on a client device in a communication network, wherein the proxy is configured to:
monitor data packets received at the client device via the proxy, wherein monitoring the received data comprises scanning each received data packet for one or more classification parameters associated with sensitive data;
classify a first data packet and a second data packet as sensitive based on the scan detecting the parameters associated with sensitive data;
determine that the first data packet comprises payment card industry data, the second data packet comprises personally identifiable information data, and the payment card industry data is different from the personally identifiable information data, wherein the personally identifiable information data is required to flow through an application programming interface (API) gateway; and route the first and the second data packets in accordance with one or more policies applicable to the sensitive data classification, wherein the routing comprises:

transmitting the first data packet to an intrusion detection and prevention system that generates alerts in response to traffic in a cardholder data environment being compromised; and transmitting the second data packet to a web application firewall (WAF).

10. The system of claim 9, wherein the execution of the instruction by the processor further comprises separating the first and the second data packets from one or more other data packets in a data stream, wherein at least one of the other data packets in the data stream has a different classification.

11. The system of claim 10, wherein the proxy further routes the at least one of the other data packets in the data stream in accordance with different policies applicable to the different classification.

12. The system of claim 9, further comprising a honeypot device isolated from one or more devices in the communication network, wherein the proxy routes the first and the second data packets to the honeypot device.

13. The system of claim 12, wherein the honeypot device identifies that the first and the second data packets do not meet a defined level of security risk, and wherein the proxy routes the first and the second data packets based on the identification that the first and the second data packets do not meet the defined level of security risk.

14. The system of claim 12, wherein the honeypot device identifies that the first and the second data packets meet a defined level of security risk, and continues to isolate the first and the second data packets based on the identification that the first and the second data packets meet the defined level of security risk.

15. The system of claim 9, further comprising one or more libraries that store a plurality of parameters associated with the sensitive data, wherein the proxy classifies the first and the second data packets based on the one or more libraries.

16. The system of claim 9, wherein the proxy routes the first and the second data packets from one service infrastructure governed by at least one of the policies to another service infrastructure governed by another one of the policies until the policies applicable to the sensitive classification are satisfied.

17. A non-transitory, computer-readable storage medium, having embodied thereon a program executable by a processor to perform a method for managing data stream identity, the method comprising:

installing a proxy on a client device in a communication network;

monitoring data packets received at the client device via the proxy, wherein monitoring the received data comprises scanning each received data packet for one or more classification parameters associated with sensitive data;

classifying a first data packet and a second data packet as sensitive based on the scan detecting the parameters associated with sensitive data;

determining that the first data packet comprises payment card industry data, the second data packet comprises personally identifiable information data, and the payment card industry data is different from the personally identifiable information data, wherein the personally identifiable information data is required to flow through an application programming interface (API) gateway; and routing the first and the second data packets in accordance with one or more policies applicable to the sensitive data classification, wherein the routing comprises:

transmitting the first data packet to an intrusion detection and prevention system that generates alerts in response to traffic in a cardholder data environment being compromised; and transmitting the second data packet to a web application firewall (WAF).

18. The storage medium of claim 17, wherein classifying the first and the second data packets as sensitive includes separating the first and the second data packets from one or more other data packets in a data stream, wherein at least one of the other data packets in the data stream has a different classification.

19. The storage medium of claim 18, wherein the method comprises routing the at least one of the other data packets in the data stream in accordance with different policies applicable to the different classification.

20. The storage medium of claim 17, wherein routing the first and the second data packets includes routing the at least one data packet to a honeypot.

* * * * *